US009362039B2

(12) United States Patent
Walz

(10) Patent No.: US 9,362,039 B2
(45) Date of Patent: Jun. 7, 2016

(54) COMPOSITION AND METHOD OF APPLICATION TO REDUCE MAGNETOSTRICTION LOSSES IN ENCAPSULATED MICROELECTRONIC COMPONENTS

(71) Applicant: Herman Walz, Commack, NY (US)

(72) Inventor: Herman Walz, Commack, NY (US)

(73) Assignee: Aeroflex Plainview, INC., Plainview, NY (US)

( * ) Notice: Subject to any disclaimer, the term of this patent is extended or adjusted under 35 U.S.C. 154(b) by 417 days.

(21) Appl. No.: 13/859,827

(22) Filed: Apr. 10, 2013

(65) Prior Publication Data

US 2014/0308438 A1 Oct. 16, 2014

(51) Int. Cl.

| | |
|---|---|
| ***C08J 9/32*** | (2006.01) |
| ***H01F 27/02*** | (2006.01) |
| ***H01F 41/00*** | (2006.01) |
| ***H01F 27/33*** | (2006.01) |
| ***H01F 27/34*** | (2006.01) |

(52) U.S. Cl.

CPC .............. *H01F 27/022* (2013.01); *H01F 27/33* (2013.01); *H01F 27/34* (2013.01); *H01F 41/005* (2013.01); *Y10T 428/2984* (2015.01)

(58) Field of Classification Search

CPC .................................................... H01F 27/022

See application file for complete search history.

(56) References Cited

U.S. PATENT DOCUMENTS 4,722,943 A * 2/1988 Melber .................. B01J 13/206 428/407

* cited by examiner

*Primary Examiner* — Hannah Pak

(74) *Attorney, Agent, or Firm* — Thomas A. O'Rourke; Bodner & O'Rourke, LLP

(57) ABSTRACT

A buffer material protects a microelectronic device in space constrained environments, for improved efficiency with respect to magnetostrictive materials therein, and includes a gas filled polymer shell microsphere carried in an elastomeric polymer binder. Expanded Expancel microspheres being less than 20 microns in diameter form 80% of the composition by volume. The polymer binder is a low viscosity dimethyl silicone with a hardness of less than 25. Coating thicknesses may be based upon the overall expected dimensional changes of the encapsulation material, due to its coefficient of thermal expansion and an expected operating temperature range of the component, plus the expected shrinkage of that encapsulation material during polymerization and the overall mass which shall be exerting a force upon the magnetic core, plus the dimensional changes of the component as a result of the flux density resulting in magnetostriction of the magnetic core.

1 Claim, 6 Drawing Sheets

COMPOSITION AND METHOD OF APPLICATION TO REDUCE MAGNETOSTRICTION LOSSES IN ENCAPSULATED MICROELECTRONIC COMPONENTS

FIELD OF THE INVENTION

The present invention relates to improvements in materials usable for reducing adverse effects upon magnetostrictive materials, and more particularly to a coating that may be used to protect a microelectronic component that must be encapsulated or be rigidly supported, to thereby increase its efficiency.

BACKGROUND OF THE INVENTION

The phenomenon of magnetostriction pertains to the change exhibited in a material's dimensions or shape when it is exposed to an external magnetic field. Another perspective on such behavior is that these magnetostrictive materials convert magnetic energy into mechanical energy, as exposure to the magnetic field induces deformation of the material, which is known as the Joule Effect, and which may be measured using a strain gauge to determine the relative displacement of particles in the object (i.e., the ratio of elongation with respect to the original dimension). Where a magnetostrictive material is induced by the Joule effect to elongate in a lengthwise direction, through rotation and reorientation of small magnetic domains therein—regions of uniform magnetic polarization—a corresponding decrease in the material dimension is experienced in the transverse direction, resulting in negligible changes to its volume. Increases to the strength of the magnetic field applied to the material further increase the induced strain (μL/L-units of micro-length per unit length), until its saturation value (λ) is reached, at which generally all the magnetic domains of the material are aligned with the applied magnetic field.

The reverse phenomenon also exists, where a mechanically induced change to the magnetostrictive material's dimensions creates a corresponding magnetic field, in what is referred to as the Villari Effect. This bi-directional coupling between magnetic and mechanical states is inherent to the particular material, and does not degrade with the passage of time, although a ferromagnetic material that is induced to undergo magnetostriction will not naturally be restored back to it initial magnetization state, after the magnetic field is removed, which reflects the magnetic memory of that material. Certain compositions of ferromagnetic materials will retain an imposed magnetization indefinitely and are termed "permanent magnets." In general, energy must be supplied to drive back the magnetic domains in the material, by the imposition of a magnetic field in the opposite direction. This reluctance to retraceability is known as the hysteresis loop.

The magnetostrictive effect of certain materials (e.g., nickel) were productively used in early applications such as telephone receivers and torque meters, and the Villari effect is commonly used in contact-less sensors. While copper exhibits the greatest room temperature magnetostriction of any pure element and saturates at 60 microstrains, the 1970s discovery of "giant" magnetostrictive alloys (the alloying of elements whose magnetostrictive behavior results in strains greater than 1000 μL/L when exposed to small magnetic fields), is now successfully utilized as sound and vibration sources, for vibration controls, for motional controls, and for materials processing (see, "Handbook of Giant Magnetostrictive Materials," by Goran Engdahl). Currently, the greatest room-temperature magnetostriction of an alloy is shown by Terfenol-D—a combination of terbium (Ter), iron (Fe), and the rare earth element dysprosium (D). Terfenol was developed by the Naval Ordnance Laboratory (NOL), and exhibits roughly 2000 microstrains in a magnetic field of 2 kOe (160 kA/m), so it is the most commonly used magnetostrictive material in engineering applications.

However, while the magnetostrictive effect may be harnessed for beneficial uses, there are also unproductive results and drawbacks. A common side effect is the annoying humming sound resulting from the 60 Hz applied magnetic field on an AC electrical transformer, where a maximum change in length occurs twice per cycle, producing a 120 Hz humming sound plus harmonics. A similar humming may be heard around high power electric lines carrying alternating current. In addition, a significant counterproductive result also occurs where magnetic devices, such as small high voltage power supplies, transformers, and inductive components, must be securely mounted or must be encapsulated, and because of this constraint on its dimensional changes, a loss in efficiency of the device results.

In applications where an external pressure is applied—either by restriction of deformation by a rigid encapsulant or contraction due to polymerization of a rigid encapsulant, or by the mere use of the magnetostrictive device in a high pressure application—it is desirable to surround the magnetic device with a suitable compressible media. Closed cell foams have been used in those applications where space and size permit. However, in small assemblies, particularly for microelectronics, use of the prior art foams and methods is not feasible. The present invention discloses a new coating that has been tested on microelectronics to successfully counter such losses in efficiency, and furthermore discloses specific application techniques/requirements.

OBJECTS OF THE INVENTION

It is an object of the invention to provide a means of reducing the magnetostrictive effect upon ferromagnetic materials.

It is another object of the invention to provide a method of improving the efficiency of ferromagnetic devices that are constrained by a rigid encapsulant.

It is a further object of the invention to provide a coating material that may be used as a buffer between a ferromagnetic device and a source of pressure applied to the device.

It is another object of the invention to provide a means of resisting pressure applied to a ferromagnetic device that does not result in significant loss in efficiency of the device.

It is also an object of the invention to provide a means of encapsulating a microelectronic device while maintaining its efficiency.

It is another object of the invention to encapsulate the surfaces of a microelectronic component with a protective coating having a thickness in proportion to an anticipated total micro-strain at saturation.

It is also an object of the invention to provide a coating on two sides of a microelectronic device to create a mechanical buffer against constraints thereat by the component's supporting means.

Further objects and advantages of the invention will become apparent from the following description and claims, and from the accompanying drawings.

SUMMARY OF THE INVENTION

Ferromagnetic materials exhibit the property of magnetostriction—a linkage between the material's mechanical and magnetic states—where the magnetic domains within the material are induced to change direction by a magnetic field, resulting in small changes in its dimensions. Microelectronic devices utilizing such materials, and which are constrained by their means of support or by being encapsulated by a rigid material, exhibit a loss in efficiency due to the constraint of the magnetostrictive properties of the ferromagnetic material.

The present invention discloses a buffer material that provides exceptional protection for a microelectronic device, thereby improving its efficiency with respect to magnetostrictive materials therein. The composition includes a gas filled polymer shell microsphere carried in an elastomeric polymer binder. Dry expanded Expancel microspheres may be used, and are preferably about 20 microns in diameter. The microspheres form 80% of the composition by volume. The gas used to expand the microspheres may be isobutane. The polymer binder is preferably a low viscosity dimethyl silicone configured to exhibit a hardness of less than 25.

In general, a coating of the disclosed composition may be applied uniformly over each of the surfaces of the microelectronic component, prior to its encapsulation. Using a thickness of approximately 15 mils may suffice in most cases (note—a "mil" equals a thousandth of an inch).

However, for electronic assemblies where space is limited and/or where alloyed materials are used for the magnetic core, the thickness of the composition to be applied may be determined mathematically to provide a mechanical buffer based on the particular component and its usage, and based on the particular encapsulation material. Specifically, the thickness of the composition applied may be determined based upon the overall expected dimensional changes of the encapsulation material, due to its coefficient of thermal expansion and an expected operating temperature range of the component, plus the expected shrinkage of that encapsulation material during polymerization and the overall mass which shall be exerting a force upon the magnetic core, plus the dimensional changes of the component as a result of the flux density resulting in magnetostriction of the magnetic core.

Furthermore, where space considerations are critical, the thickness of the composition may be calculated for, and applied to, specific corresponding pairs of surfaces, to be in proportion to the total micro-strain at saturation, in that direction, to provide necessary buffering with minimal impact on component volume. Each pair of surfaces of a six-sided microelectronic component would thus have a respective coating thickness tailored for that direction, so that when paired together the coating on those planes would be capable of accommodating maximum positive magnetostriction in that surface-to-surface direction. The coating may alternatively be tailored according to the orientation of the magnetic domains of the ferromagnetic material of the microelectronic part, and the constant direction of a magnetic field, so that only the component's pair(s) of mounting surfaces that will experience positive magnetostriction need be coated.

In general, it may be advantageous to coat all of the planes of interest on the microelectronic components (i.e., applying the coating onto six sides of the block-shaped component). Tests on a typical transformer operated at moderate flux density with and without the use of the coating of the present invention have shown a reduction in losses of greater than 50%.

DETAILED DESCRIPTION OF THE INVENTION

Ferrite magnetics, as well as other ferromagnetic materials, exhibit the property of magnetostriction, which is where the magnetic domains within the material change direction while in the presence of a magnetic field, resulting in small changes in the dimensions of the material. Magnetic devices which are constrained by their means of support or which must be encapsulated with a rigid material, exhibit a loss in efficiency due to the constraint of the magnetostrictive properties of the ferromagnetic material. Encapsulation of such electronic components is common in hostile environments (e.g., "down-hole" mining/drilling applications, deep-sea operations, etc.), and for military applications, the requirements for which may be found in MIL-T-27E.

Although previously disclosed foams and other compressible media have been satisfactorily employed where space is not critical, use of those inventions in smaller assemblies, particularly for microelectronic components, has not proved successful for meeting both the space requirements and the buffering requirement, to improve the efficiency of those devices. Tests conducted using the coating of the present invention have demonstrated markedly improved efficiency in the operation of such constrained microelectronic devices, while minimizing impact to the volume required for the component.

Figure 4A:
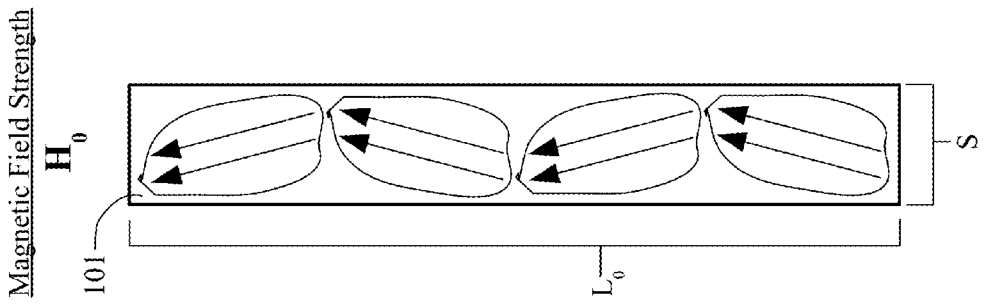
FIG. 4A through 4D illustrate the changing of the magnetic domains within a ferromagnetic material, from a initial state where there is no applied magnetic field and almost no common orientation in the pattern of the domains, to where an applied magnetic field produces a saturation effect, and most of the magnetic domains have become aligned with the magnetic field direction.
Figure 4B:
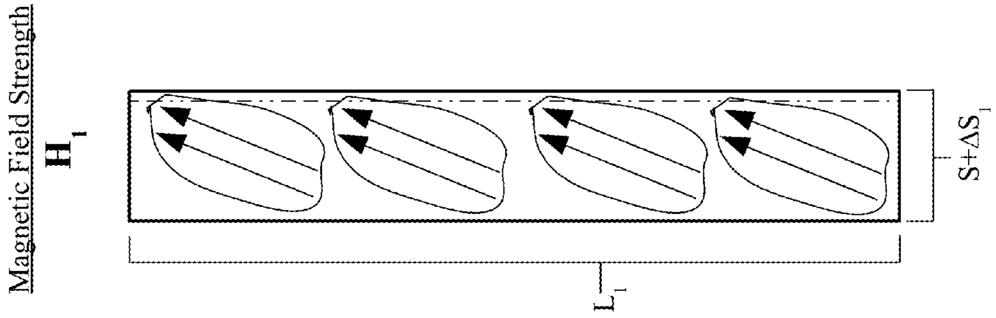
Figure 4C:
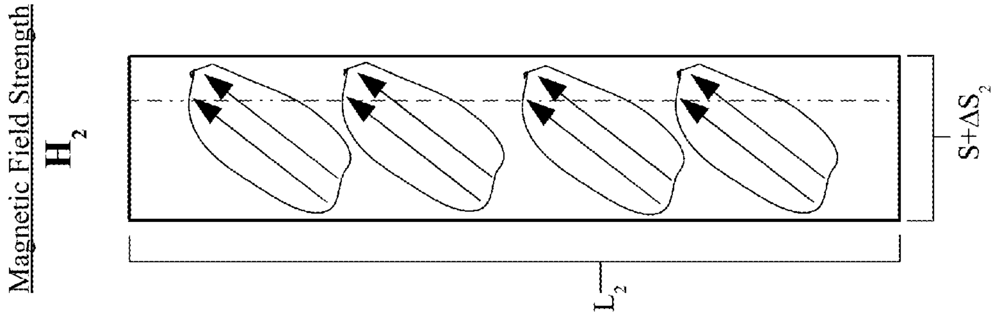
Figure 4D:
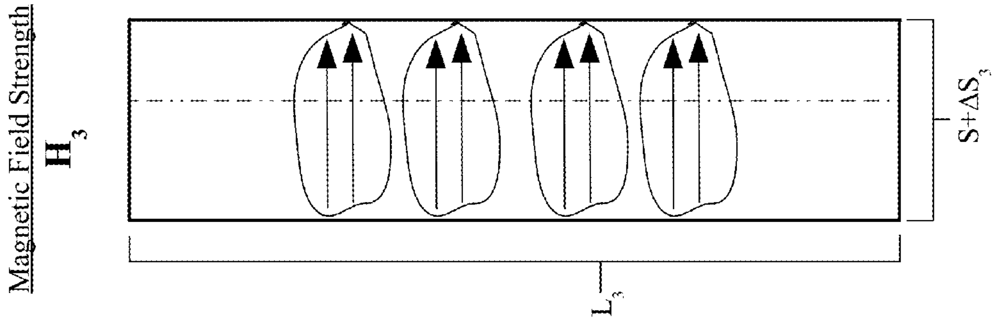

FIG. 4A through 4D illustrate the changing of the magnetic domains within a ferromagnetic material of a microelectronic device 101. As seen in FIG. 4A, where the microelectronic device 101 may be in an initial state where it is not exposed to a magnetic field, there is little common orientation in the pattern of the domains, and the device may have initial dimension of "$L_O$" and "S." Any small amount of common orientation therein would be present as a permanent magnetic bias. In FIG. 4B, the microelectronic device 101 may be exposed to a small magnetic field of strength $H_1$, which may result in minimal of alignment of the magnetic domains in the device with the direction of the magnetic field. The dimension of the material in the direction of alignment may increase from the initial state of "S" to "$S+\Delta S_1$," the amount of induced micro-strain for the particular material, for that particular magnetic field strength. A further increase in the magnetic field to strength $H_2$ may result in further alignment of the magnetic domains and a corresponding increase in micro-strain (material dimension of "S+$\Delta S_2$"), until the magnetic field strength reaches the saturation value for the particular material, denoted as $H_3$, at which most of the magnetic domains in the device have become aligned with the magnetic field direction.

The problem with microelectronic devices is exacerbated by the high flux densities that are desirable in order to reduce the size and weight of magnetics, which is where the magnetostrictive effect is most pronounced. The buffering system of the present invention significantly reduces the compressive and expansive forces upon magnetic cores, thereby reducing losses typically experienced in devices which employ ferromagnetic materials having a high magnetostriction coefficient and which operate at moderate to high flux densities. The system of the present invention is a specially devised coating, which may be applied uniformly, or may alternatively be applied in accordance with one of the particular methods disclosed herein.

Figure 3:
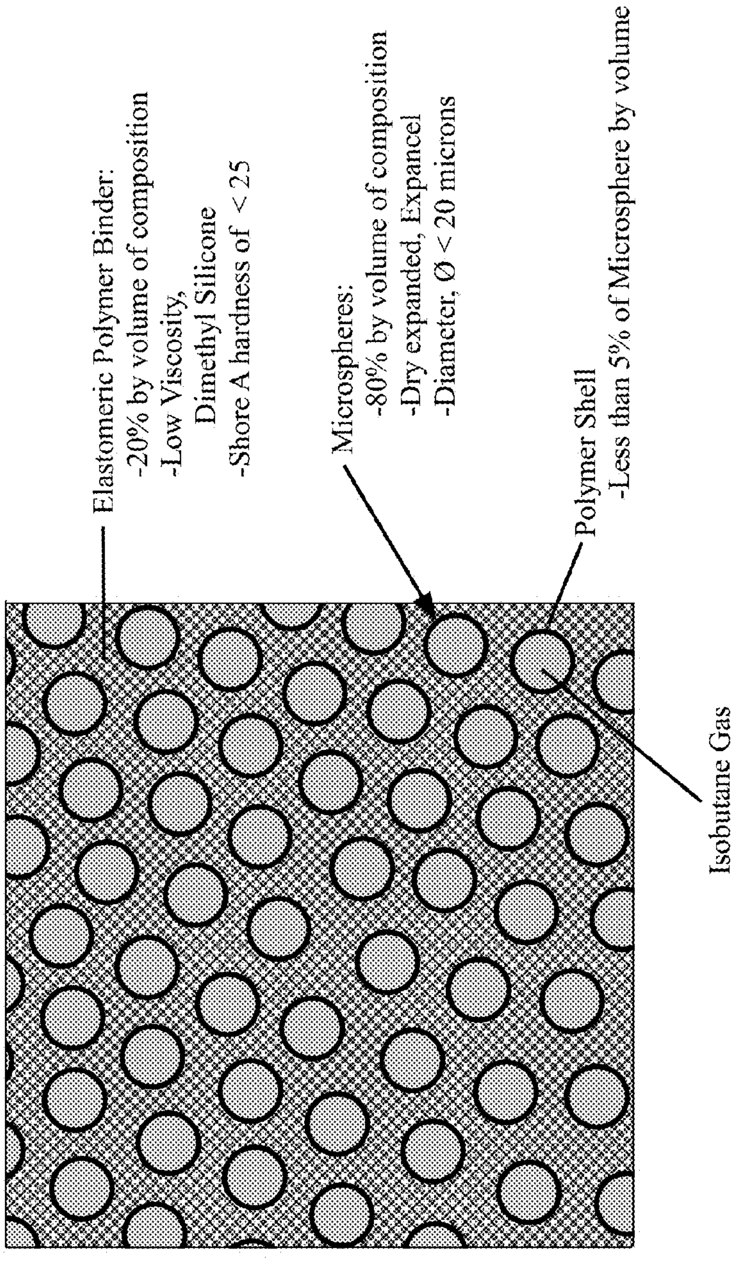
FIG. 3 is a diagram illustrating the structure of the composition of the present invention.

A diagram of the composition of the present invention is illustrated in FIG. 3. The composition serves to provide the compressibility of a gas in a solid system to achieve satisfactory mechanical buffering of microelectronic components. The composition of the coating material may be primarily an elastomeric polymer binder. The binder may form 20 percent of the composition by volume, and may be a low viscosity soft dimethyl silicone plus toluene and/or a very low viscosity silicone diluent, although other binder materials could also be used, such as epoxides, urethanes, vinyls, rubbers (e.g., polyisoprene, polybutadiene, neoprene, etc), perfluoroelastomers, polyethylene, polysulfide, and natural organic adhesives. The chosen viscosity of the dimethyl silicone aids in the amount of Expancels that can be incorporated into the composition, while nonetheless maintaining a workable mixture. When properly formed, the binder may exhibit a Shore A hardness of less than 25, resulting in a soft buffer material that accommodates three-dimensional movement and alleviates stress concentrations.

The composition also includes gas-filled polymer shell microspheres carried in the elastomeric polymer binder. The microspheres may form 80 percent of the composition by volume. The suitable microspheres are preferably 20 microns in diameter or smaller, and may be formed of acrylonitrile or vinylidene Chloride. The microspheres may be the dry, expanded, gas filled Expancel® microspheres that are available from AkzoNobel, in Duluth, Ga. The gas utilized may be isobutane. The microspheres are ideally dispersed uniformly throughout the binder, which is initially achieved by mixing during preparation.

To maximize the buffering capability of the composition, the microsphere fill is desirable maximized. Utilizing microspheres having a diameter of 20 microns or less optimizes the volume of microspheres, but also maintains a sufficiently high mean free path in the binder. The use of larger spheres resulted in minimizing the volume of spheres that might be mixed into the adhesive vehicle. In another embodiment, the use of smaller, random sized spheres—being smaller than 20 microns—is also desirable. Also, utilizing microspheres to form greater than 80% by volume of the composition, while furthering its ability to absorb dimensional changes of the microelectronic component and the rigid encapsulation coating, negatively impacted the application and workability of the composition. Improved flow of the composition for its application, while also accommodating higher loading ratios of the microspheres, was obtained through the use of a lower viscosity binder. The binder is preferably a low viscosity dimethyl silicone, which may result in a viscosity ranging between 10,000 and 50,000 cps. Two different viscosity levels are preferably utilized for different applications of the composition, as discussed hereinafter.

For its preparation, the low viscosity dimethyl silicone is mixed with a solvent, currently toluene, which may alternatively be a reactive diluent. The Expancel microspheres are blended into the mixture of solvent and dimethyl silicone, with mechanical stirring.

Application of the composition may be by a brush, a roller, a syringe, or other suitable application means, after which the coating requires a period of time to dry. The composition may be mixed at the time of use or it may be mixed and stored in sealed bottles, which require agitation to reduce material separation prior to application. A roller and vibrator may be utilized to maintain the dispersion after formation of the composition.

Microsphere loading of greater than 70% by volume is achieved with the composition as described, as the microspheres may be compressed to several atmospheres of pressure to thereby provide exceptional mechanical buffering for the microelectronic component.

Figure 1:
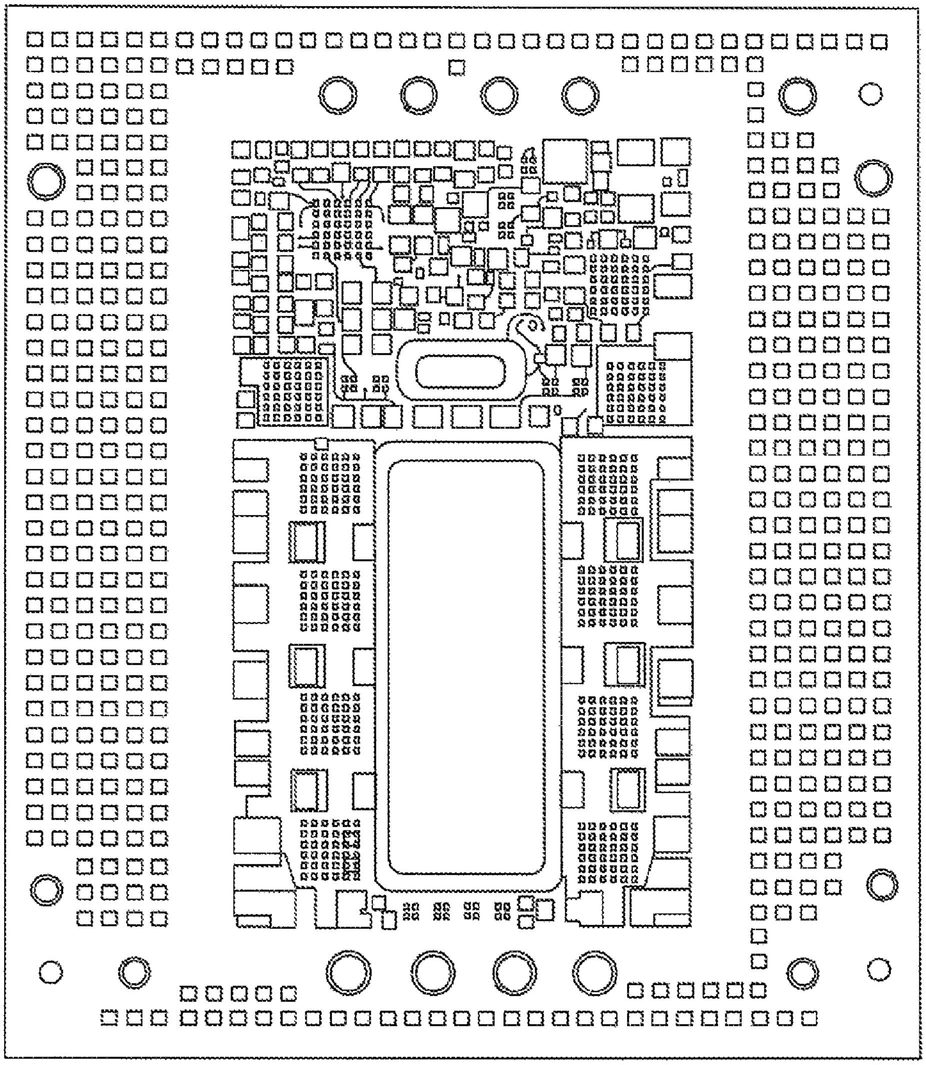
FIG. 1 is a view of a "PV" power supply board, where the composition of the current invention had been applied to small ferrite transformers.
Figure 2:
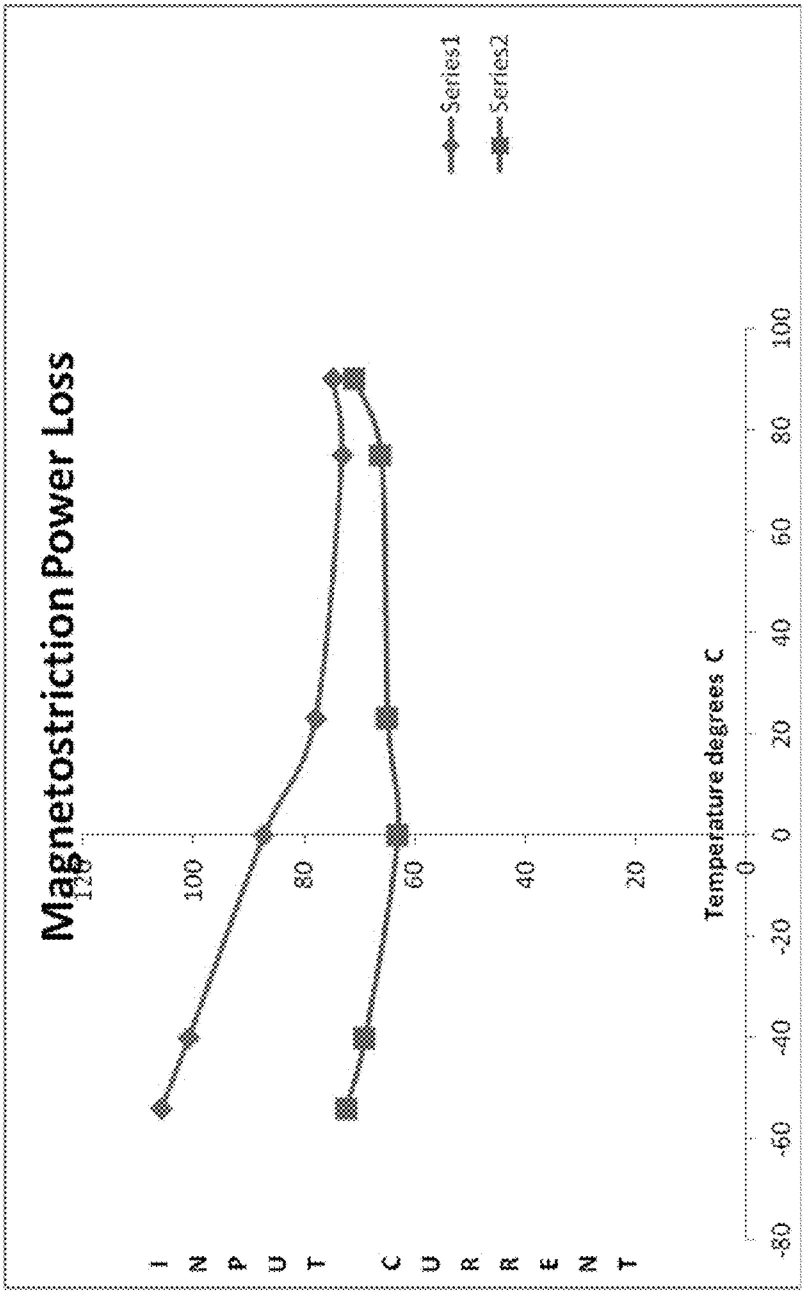
FIG. 2 is a graph showing test results for a typical transformer operated at moderate flux density with and without the use of the coating of the present invention.

FIG. 1 illustrates use of the composition on microelectronic components, such as the small ferrite transformers in the "PV" power supply board shown therein, which are operating at a moderately high flux density. Test data for the coating applied thereto is shown in FIG. 2. In FIG. 2, the Series 1 data represents the no-load input current of a transformer encapsulated in an epoxy, and the Series 2 data represents the same transformer buffered in a coating of the composition of the present invention, which is then encapsulated in the same epoxy. The coating may reduce losses by greater than 50%.

Figure 7:
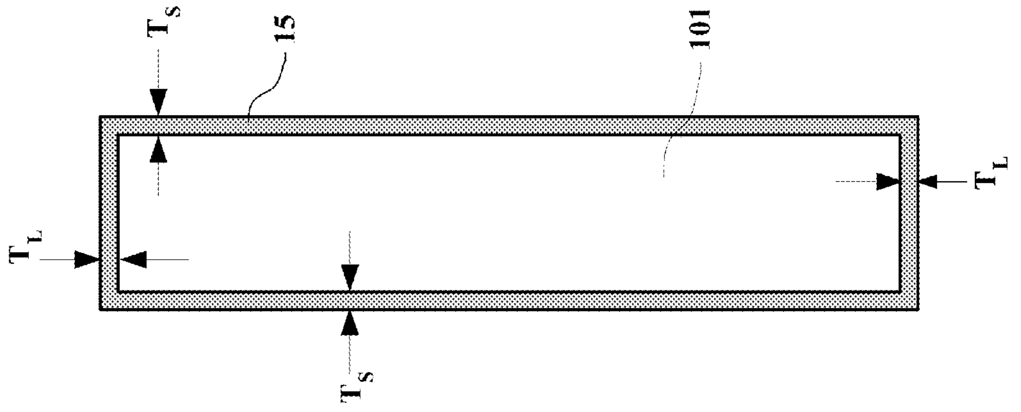
FIG. 7 shows the microelectronic device of FIG. 5, with the coating of the present invention having been applied to two pairs of sides of the device.

The coating may be applied over each of the surfaces of the component (all of the planes of interest), which may be necessary in certain cases, such as for microelectronic components to be utilized in "down-hole" (mining/drilling) applications, deep-sea operations, etc. As seen in FIG. 7, a uniform thickness of coating 15 may be applied to the sides of the component in both the "L" direction and the "S" direction (i.e., $T_S=T_L$), and it may also be applied in the "ST" direction, or the "R" direction for a rod (not shown). Using a thickness of approximately 15 mils may suffice in most cases (note—a "mil" equals a thousandth of an inch).

However, for electronic assemblies where space is limited and/or where alloyed materials are used for the magnetic core, the thickness of the composition to be applied may be determined mathematically to provide a mechanical buffer based on the particular component and its usage, and based on the particular encapsulation material. Specifically, the thickness of the composition applied may be determined based upon the overall expected dimensional changes of the encapsulation material, due to its coefficient of thermal expansion and an expected operating temperature range of the component, plus the expected shrinkage of that encapsulation material during polymerization and the overall mass which shall be exerting a force upon the magnetic core, plus the dimensional changes of the component as a result of the flux density resulting in magnetostriction of the magnetic core. (Note, for a discussion of flux density, see, U.S. Pat. No. 6,084,499 to Faulk for "Planar Magnetics with Segregated Flux Paths," the disclosures of which are incorporated herein by reference).

Polymer encapsulation materials for use on microelectronic components typically include epoxides and urethanes, but other materials may also be used, such as the rubbers (Polyisoprene, polybutadiene, neoprene, etc.), polysulfides, and pefloroelastomers. The linear coefficient of thermal expansion (TCE) for those families of materials range between 12 ppm/deg C. to greater than 200 ppm/deg C. In most magnetic applications epoxides are the primary choice with typical TCE's being in the range of 40-80 ppm/deg. C. However, the materials of choice for encapsulation of microelectronic components in space limited applications have a TCE ranging between 12 ppm and 20 ppm. The encapsulating material may expect to experience a temperature ranges of +130 degrees C. to −55 degrees C.

Where space considerations are critical, the thickness of the coating may be tailored—be correlated—to the dimensions of the component (i.e., $T_S \neq T_L$), since the resultant total micro-strain experienced is dependent upon the overall dimensions (μL/L-units of micro-length per unit length). Therefore, in the "L" direction, which may undergo a greater total micro-strain, the coating thickness $T_L$ may be greater than the thickness $T_S$, as the mechanical buffering to be provided in the "S" direction by the coating of thickness $T_S$, generally speaking, need not be nearly as large.

With respect to the shrinkage of the encapsulating material, the linear shrinkage (S) of the material in a single plane is given by the relationship: $S=L*TCE*\Delta t$, where $\Delta t$ is the change in temperature (degrees C.). Also, the inherent shrinkage during polymerization (curing) of the encapsulating material may generally range from 0.1 to slightly greater than 0.4%. (0.4% is on the lower side for most epoxides). Therefore, for a one by one inch rectangle cured at 125 degrees C., the total shrinkage "S" would be 0.004 inches due to the polymerization, and 2.16E-3 inches for the reduction in temperature from the 125 cure temperature to −55 degrees C., a total of 6.16E-3 inches.

In view of the required mechanical buffering to be provided for the microelectronic component, based on the maximum anticipated micro-strain at saturation, a proportionality factor may be used to determine the optimal coating thickness for each of its three pairs of sides.

Figure 6:
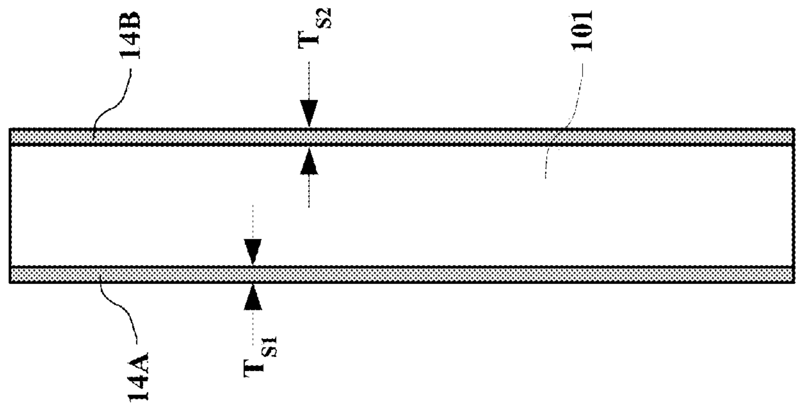
FIG. 6 shows the microelectronic device of FIG. 5, with the coating of the present invention having been applied to first and second sides of the device.
Figure 5:
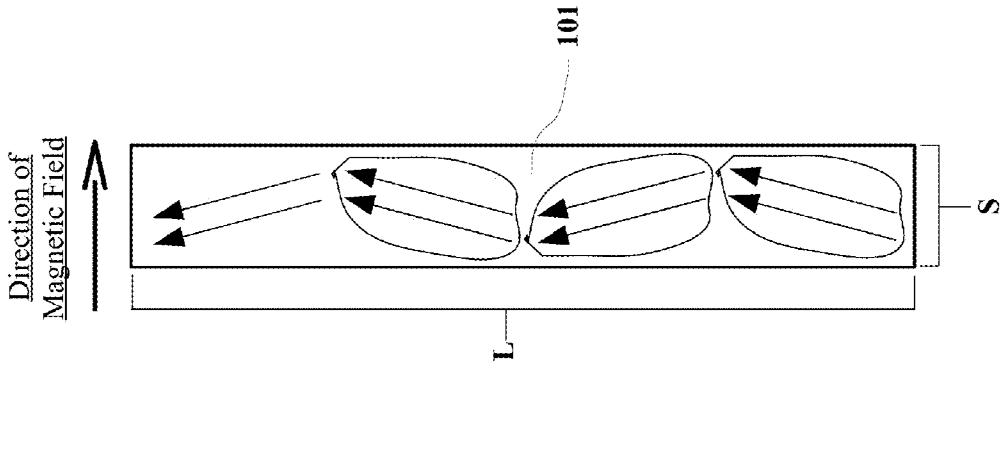
FIG. 5 shows a microelectronic device and its dimensions in the lengthwise and transverse directions.
Figure 8:
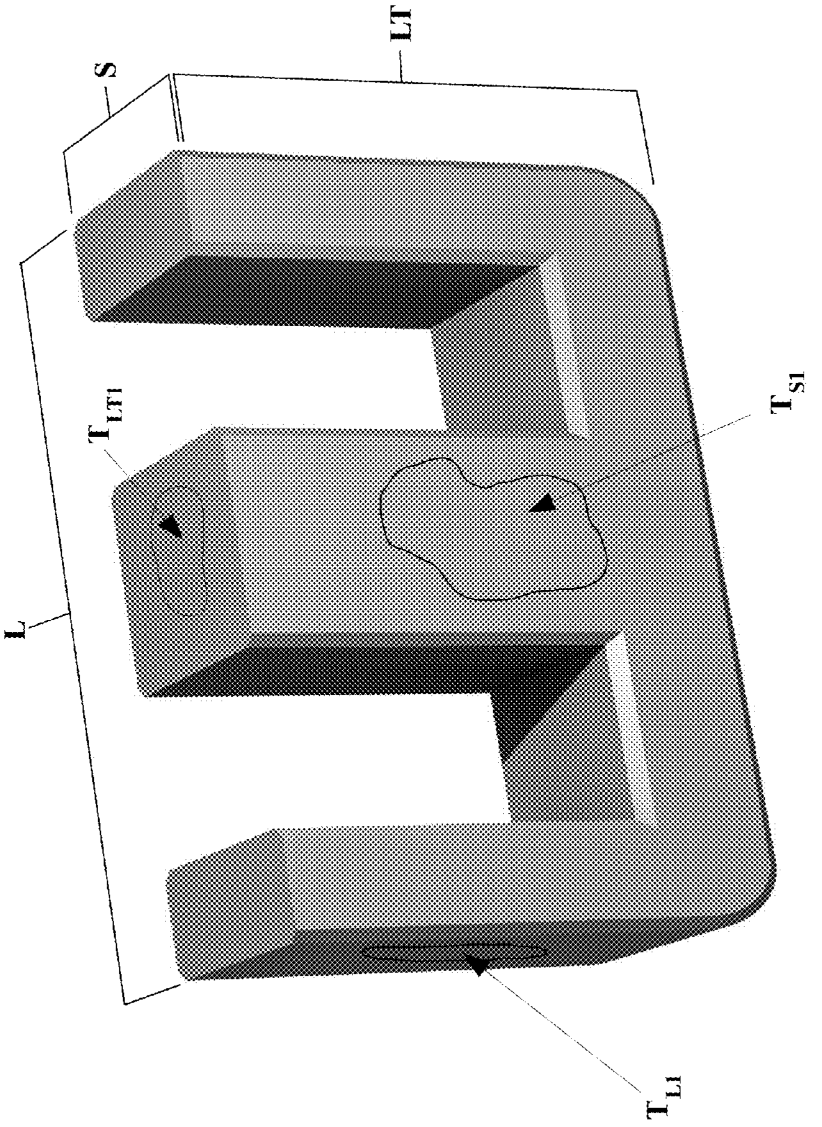
FIG. 8 shows a conventional E-core of a transformer, and the planes of interest that would require coating by the composition of the present invention.

Another consideration may further reduce the necessity of utilizing a uniform coating thickness, a practice which would unnecessarily sacrifice space about the microelectronic component—space which may not ideally or practically be available. Where the component is merely to be rigidly supported and not be completely encapsulated by a rigid material, a determination of the magnetic domains in the microelectronic component 101 of FIG. 5 may be made, and may be determined to be the same as those of FIG. 4A. Where the magnetic field direction will constantly be producing positive magnetostriction in the same component directions—for example the "S" direction—the coating need only therefore be applied to those corresponding surfaces at which a support member will restrict dimensional changes of the component. Therefore, as seen in FIG. 6, a coating of suitable thickness ($T_S$) may be applied to only those two surfaces. The coating on each surface may be the same (i.e., $T_{S1}=T_{S2}$). Alternatively, where a substantial portion of one of those two surfaces may be in contact with a support member, and the other side experiences minimal contact, which may produce higher stresses in the buffering material, the coating thickness on each surface may be different (i.e., $T_{S1} \neq T_{S2}$). In such instances, a localized application of coating may be performed only at the mounting location experiencing such minimal contact. In general, the composition may be applied using adhesive dispensing equipment, such as by using a brush, or a roller, or other such means.

In the exemplary use of the composition of the current invention on the ferrite transformers in the "PV" power supply board shown in FIG. 1, it is advantageous to manufacture two compositions of different viscosities, to be utilized in two separate applications. A lower viscosity composition may preferably be applied using a syringe for under-filling the transformer—to fill the area between the core and the printed wiring board (PWB) as well as well as around the legs of the ferrite which are "buried" within the PWB, so a somewhat thinner mixture is necessarily used. This composition may have a viscosity of approximately 10,000 cps, and may be formed by adding additional solvent to the mixture, which flashes off. A second, higher viscosity composition may be applied to the sides of the transformers for buffering the perimeter, and may be deposited with a larger diameter syringe, or a brush to better control the thickness of the coating. This composition may have a viscosity of approximately 50,000 cps.

The examples and descriptions provided merely illustrate a preferred embodiment of the present invention. Those skilled in the art and having the benefit of the present disclosure will appreciate that further embodiments may be implemented with various changes within the scope of the present invention. Other modifications, substitutions, omissions and changes may be made without departing from the spirit of this invention.

What is claimed is:

1. A buffer material, for use in encapsulating a microelectronic device for improved efficiency with respect to magnetostrictive materials therein, said buffer material comprising:

a gas filled polymer shell microsphere carried in an elastomeric polymer binder;

said polymer shell of said microsphere comprising an acrylic copolymer;

said polymer shell being less than 20 microns in diameter, and comprising 80% by volume of said buffer material;

said gas comprising isobutane;

said elastomeric polymer binder comprising a low viscosity dimethyl silicone, said binder configured to exhibit a hardness of less than 25.

* * * * *